Oct. 10, 1944.   W. J. WRIGHTON ET AL   2,360,185
PROCESS OF MANUFACTURING METAL BAR STOCK
Filed Feb. 8, 1941

INVENTORS
WILLIAM J. WRIGHTON
TRACY C. JARRETT
BY Louis L. Gagnon
ATTORNEY.

Patented Oct. 10, 1944

2,360,185

UNITED STATES PATENT OFFICE 2,360,185

PROCESS OF MANUFACTURING METAL BAR STOCK

William J. Wrighton and Tracy C. Jarrett, Southbridge, Mass., assignors to American Optical Company, Southbridge, Mass., a voluntary association of Massachusetts Application February 8, 1941, Serial No. 378,112

8 Claims. (Cl. 29—188)

This invention pertains to the process and/or means for manufacturing bar stock to be used for producing single plate gold-filled material such as wire.

It is a preliminary object of the invention to produce a simpler, more economical, and faster means of producing single plate gold-filled wire.

A further object is to afford a more accurate control over the time and soldering temperature in the process of manufacturing gold-filled wire.

A further object is to produce gold-filled wire having better qualities in that the heating operation for soldering is obtained by controlled high frequency current generating apparatus.

A further object is to utilize a method wherein the shell of gold is wrapped with a layer of wire for a more intimate contact between the gold shell and the core during the critical heating range of the soldering operation.

A still further object is to provide a layer of wire wrapped about the gold shell, which wire has a critical point during the heating operation which is substantially within the same range as the critical range for the soldering operation so that during the soldering operation the binding wire layer tends to contract to form a more intimate contact between the gold shell and the core material.

A still further object is to provide a means and/or process of manufacturing gold-filled material by utilizing induced currents to preferably high frequency to heat the material from within the core rather than from the gold skin inwardly and/or to restrict expansion of the binding wire due to eddy current action.

Other objects and advantages will become apparent from the following description taken in connection with the accompanying drawing, and it will be apparent that many changes may be made in the details of construction, arrangements of parts, and steps in the process without departing from the spirit of the invention as expressed in the accompanying claims. The exact details shown and described are preferred forms only, shown by way of illustration and are not to be considered as limitations.

Referring to the drawing.

Figure 1:
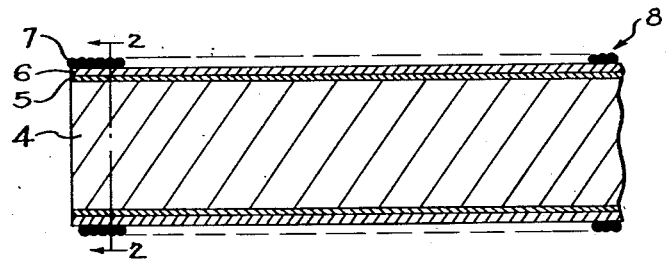
Fig. 1 is a fragmentary sectional view of the assembled unit having the wire-binding layer adjacent the skin of the gold shell compressing the silver solder sheet against the core material.

Heretofore, the production of single plate gold-filled wire required the preliminary step of making bar stock which utilized a process of forming an intimate bond between the core and a shell of gold by forcing a soft steel shell around the shell of gold which remained there during the soldering operation in the gas furnace. After the assembled bar stock, and holding shell was removed from the furnace when the soldering operation was completed, the holding or compressing shell was withdrawn from the shell of gold which was placed axially around the core material. The operations of preparing the holding shell for assembly and for the actual assembling operation required more man hours when done in quantity lots than the man hours required for producing an equivalent or better quality by the process represented in the present invention.

Preliminary pinching operation

It is necessary to perform a preliminary pinching operation between the shell and the core in all cases, to aid in bringing about an intimate contact of the shell with the core before the heating is started. This pinching operation is performed by passing the assembled bar which consists of a core, a sheet of silver solder or binding material, and the shell of gold through a die smaller than the outside diameter of the shell. This step is one that is necessary prior to the binding of the shell of gold by the binding wire 7. The surfaces of the metals which are to be soldered are suitably prepared prior to the preliminary pinching operation which forces the shell of gold onto the core. One method used is to flux the surfaces with a concentrated solution of borax.

In the conventional method used wherein the preliminary pinching operation is performed by pressing a steel shell about the shell of gold, the steel shell has a tendency to spring outwardly when released from the mold or die of the punch press. The inherent qualities of the steel shell naturally result in this springing operation. Regardless of how slight the spring may be, it is undesirable since the purpose of the outer steel shell is to bring about an intimate contact between the shell of gold and the core. Any resiliency, or spring action, in the shell has a tendency to restrict the desirable intimate contact referred to herein. Further, due to machining, and abnormal characteristics in the metal such as flaws, it is extremely difficult to obtain a substantially perfect inner surface of the steel shell, which abnormalcy is generally magnified during the heating operation. The abnormalcy may result in what is known as "black spots" which indicate an imperfect bonding. When this results, the bar stock is said to be imperfect which results in discarding same, since the rolling operation, to produce the gold-filled wire, will magnify the flaws causing the gold-filled wire to be defective and unusable.

The wire binding in the present invention, which supplants the steel compressing shell, is wound in intimate convolutions of the wire so that throughout the length of the bar stock a uniform pressure is exerted upon the outer skin of the gold shell by the various adjacent turns of binding wire. The strength of the wire in itself is sufficient to take the place of the steel shell, and the binding operation requires that the binding wire be so tensioned as to eliminate any possibility of a substantially un-uniform pressure by the wire on the outer skin of the shell of gold.

Referring to the drawing and more particularly to Fig. 1 the core of the bar stock 4 may be of nickel, beryllium copper, or some other metal which will work suitably well for the objective desired, which bar stock has a sheet of silver solder 5 placed adjacent thereto and a shell of gold 6 around the sheet of silver solder. A layer of wire 7 is shown wrapped around the skin of the shell of gold 6. The entire assembly is indicated as 8 and it is now ready for receiving the heat treatment or the soldering operation.

Figure 2:
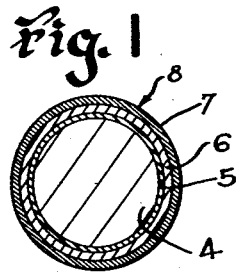
Fig. 2 is a sectional view taken along lines 2—2 of Fig. 1.

Fig. 2 is a cross sectional view taken on lines 2—2 of Fig. 1 and shows the layer of silver solder 5 which is a bonding material placed intermediate the core 4 and the shell of gold 6 with the layer of holding wire 7 all of which taken together comprise the assembly 8, which assembly is now ready to receive a heat treatment for bonding the shell of gold to the core material by means of the silver solder 5.

Figure 3:
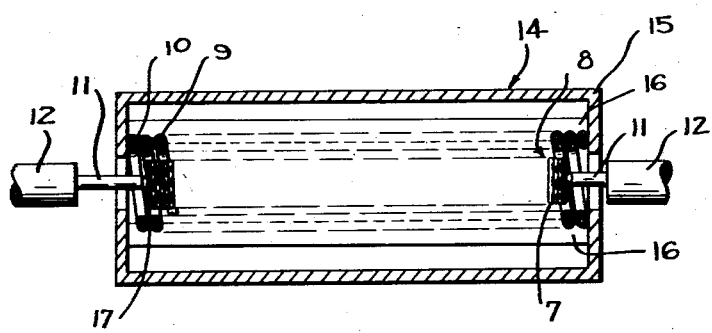
Fig. 3 is a fragmentary sectional view showing the assembled bar material with its wire-binding located within the high frequency heating coil.

Fig. 3 shows the assembly 8 supported on rotatable arbors 11 which are connected to rotatable shafts 12, which shafts are rotated by any suitable means such as a chain drive, or belt, or connected directly by gears to a motor. The means of heating is by use of high frequency currents which are supplied from any suitable apparatus, to a coil 9, which in the present instance is a copper coil, which, in fact, is the radiating conductor for emitting the high frequency currents for generating heat in the assembly 8. The copper conductor 9 has a hollow portion 10 throughout and a flow of fluid such as water is constantly passed therethrough to keep the conductor coil 9 from becoming excessively heated during the heating operation of the assembly 8. Insulation strips 16 are shown supporting the copper coil 9 and which coil it is to be understood is insulated from the adjacent turns of the conductor by proper insulation 17, in accordance with the standard of electrical engineering practice. A housing 15 supports the insulators 16 which in turn support the coil 9, the entire heating unit 14 is assembled by any suitable means for moving the assembly along the shafts 12 so that the assembly 8 may be relatively placed into the heating housing 15 of the heating unit 14, and removed therefrom by any suitable mechanical means such as by a lever action.

Two types of holding or binding wire 7 will be discussed herein in conjunction with two different types of core material. For example, when a nickel or nickel composition core is used the binding wire will be referred to generally as carbon wire which is commonly referred to as .35 carbon. When a beryllium copper core is used, a stainless steel binding type wire will be referred to in conjunction therewith. The invention uses a process which employs a layer of wire binding material in lieu of the former process of using a steel compressing shell, hence the reference to the two different types of wires for the different composition cores.

The reason for using a carbon wire in conjunction with an assembly having nickel cores is because the gold shell expands more rapidly than the nickel core under similar heating conditions. Since it is necessary to keep the shell in intimate contact with the core and the sheet of soldering material held therein, the carbon wire is used so that at the soldering temperature, the shell and the core will be in intimate engagement by means of the bonding material referred to herein as silver solder 5 which is shown in sheet form. Since the nickel core expands less than the shell, the binding wire is wrapped around the outside of the shell at right angles to the length of the core and parallel to the windings of the induction furnace. As will be seen from the drawing and the cross sectional views of Figs. 1 and 3 respectively, a layer of binding material 7 on the assembly 8 is spaced from the coil 9, which coil 9 is substantially a layer of electrical conducting material such as copper tubing. The frequency generator used may supply any frequency suitable for the results desired. A suitable frequency used in the present process ranges generally between 20,000 and 25,000 cycles.

The coil 9 which is the radiating or heating element radiates its high frequencies so that the entire assembly 8 is heated to at least a soldering temperature, which in the present case is set at approximately 1350° F. Because of the mass of the material the core and shell will tend to heat prior to the heating of the binding wire. As a result, the wire windings are heated by radiation or conduction from the core and shell, that is, the binding wire 7 is substantially heated from the inside out. When the temperature of the carbon steel wire reaches its critical point of approximately 1330°–1340° F. the soldering temperature has reached its critical point of about 1350° F. While the temperature of the critical point of the carbon steel, and the soldering temperature have been specifically set forth, it is to be understood that this is only by way of example and no intention is existent to limit the invention to the specific temperatures set forth except that the critical point of the binding wire, such as carbon steel wire, whatever that temperature may be, is utilized to perform a gripping action by its contraction when the critical point is reached so that it performs a sharp gripping action against the gold shell tending to draw it into more intimate contact with the core material as the soldering temperature is reached. The characteristics of the wire are taken advantage of and when passing through the transformation point the binding wire itself suddenly contracts and pinches the shell of gold against the core thus bringing about a better soldering condition.

The core and the shell of gold, heat up faster than the winding, due to the fact that they are placed at right angles to the axis of the induction coil. The windings then become hot from conduction with the hot core and shell. Although there is a small amount of heat generated in the binding wire from the effect of the high frequency induction coil, the mass of heat, however, comes from the hot core and shell, which will be understood by those skilled in the art as being effected by eddy currents set up within the various components of the assembly 8.

Beryllium copper core

When using the general arrangement of parts as set out in the various figures of the drawing, in conjunction with a beryllium copper core in lieu of the nickel core referred to at length hereinbefore the binding wire 7 is preferably of a stainless steel type. The stainless steel type wire heats very little from the effect of the high frequency currents, but does heat, and primarily from the conduction of the core and shell which is disposed axially through the center of the high frequency induction coil.

The pinching effect of the stainless steel type wire is somewhat different than the plain carbon steel mentioned when using the nickel or nickel composition core. The stainless steel does not go through a transformation change such as set out in regards to the carbon steel. The pinching effect produced by the stainless steel type wire is brought about by the fact that the binding wire expands only slightly during the entire heating cycle, if any expansion exists at all in contradistinction to the normal expansion of the shell. This expansion, if any, is far less than the expansion of the core and the shell together. As a consequence, the shell is restrained from expansion, and is held in intimate contact with the core because the wire will restrict or substantially prevent the shell from expanding away from the core while the core expands pressing the skin of the core against the inner surface of the shell of gold.

When soldering temperature is reached and the soldering operation is completed, the soldered surfaces are held rigid in relation to each other while the solder sets.

It will thus be seen that when using the nickel or nickel composition core, the carbon wire is utilized so that the contraction of the carbon wire at the critical point will bring the surfaces to be soldered in intimate contact. When the beryllium copper core is used, the stainless steel wire is utilized to restrict expansion of the shell of gold while the skin of the expanding core is urged in intimate contact with the inner surface of the shell of gold.

The nickel core heats much more rapidly for the same kilowatt input than the beryllium copper, this being due to the difference in the conductivity of the two metals.

The outer binding shell is used on multi-plate work such as "double plate," and it is to be understood that the method of binding set out herein may be used on "double plate" as well as on "single plate" work. In general, the wire binding operation supplants the steel shell in the preliminary pinching method so that in multi-plate work the desirable results may be obtained by using any suitable binding wire. Naturally, the various types of work may require a different characteristic binding wire if the circumstances are somewhat different than set forth herein. However, the binding method would be substantially the same. The specific examples set out herein are only by way of illustration, and it is to be understood that the binding method has been found to work equally well when other materials are used than those set out in the specification as concrete examples.

The reason for using "single plate" gold-filled wire for optical merchandise is that it is less costly to manufacture. The outer shell of gold around the core is more uniformly distributed. There is less bonding material used in the assembly of the shell and core which in turn makes it more economical. The recovery of the solid gold scrap from single shell is far more effective than the recovery of scrap from what is known as "double plate." In "double plate" it is necessary to send the scrap material direct to the refinery to recover the gold. In "single plate" all the trimmings from the disk and shell before assembling and preliminary pinching operation can be returned directly to the melting pot without going to the refinery. This enables the manufacturer to lower his inventory and the amount of gold in the process by being refined.

From the foregoing, it will be seen that all the objects set out heretofore have been attained and that other accomplishments are present which should readily suggest themselves to those skilled in the art.

In commercial practice, the process and means employed may involve some changes from the specific disclosure set out herein and minor changes may suggest themselves. The right to make certain minor departures from the specification, drawing, and disclosures generally is retained and equivalent modifications may be used in the process within the spirit of the invention as defined by the subjoined claims.

Having described our invention, we claim:

1. The process of manufacturing single plate bar stock comprising the step of assembling a relatively rapidly expanding metallic shell exteriorly of a less rapidly expanding metallic core having a sheet of metallic bonding material between said shell and said core, the second step of pressing the shell onto the core, a third step of binding the outside skin of the shell with a wire of a material having lower expansion characteristics than the shell wound in adjacent convolutions to form a layer of binding material axially of the bar stock, a fourth step of heating the bar stock and its binding layer by high frequency currents to a controlled temperature sufficient to melt the bonding material and in such a manner that there will be little, if any, expansion of the wire during said heating and expansion of the core within the shell whereby an intimate and substantially uniform bond is obtained between the core and shell and thereafter removing the binding wire.

2. The process of manufacturing bar stock for single plate gold-filled material comprising the step of placing a sheet of metal bonding material on the outer surface of a nickel or nickel alloy core, a further step of forcing the shell of gold about the bonding material and the core, a still further step of winding a layer of substantially .35 carbon wire on the outside of the gold shell, a still further step of heating the assembled parts to a temperature sufficient to melt the bonding material to cause the shell and the core to be intimately gripped by the bonding material and thereafter removing the wire.

3. The process of manufacturing bar stock for single plate gold-filled material comprising the step of placing a coating of metal bonding material on the outer surface of a nickel or nickel alloy core, a further step of forcing a shell of gold about the bonding material and the core, a still further step of winding a layer of substantially .35 carbon wire on the outside of the gold shell, a still further step of heating the assembled parts to a temperature sufficient to melt the bonding material to cause the shell and the core to be intimately gripped by the bonding material, the heating of the assembled parts being derived from high frequency currents and thereafter removing the wire.

4. The process of manufacturing bar stock for single plate gold-filled material comprising the step of placing a coating of bonding material on the outer surface of a beryllium copper core, a further step of forcing a shell of gold about the bonding material and the core, a still further step of winding a layer of stainless steel wire on the outside of the gold shell, a still further step of heating the assembled parts to a temperature sufficient to cause the bonding material to melt between the shell and the core and cause them to be intimately and substantially uniformly united by the bonding material and thereafter removing the stainless steel wire.

5. The process of manufacturing bar stock for single plate gold-filled material comprising the step of placing a coating of bonding material on the outer surface of beryllium copper core, a further step of forcing a shell of gold about the bonding material and the core, a still further step of winding a layer of substantially stainless steel wire on the outside of the gold shell, a still further step of heating the assembled parts to a temperature of approximately 1350° F. sufficient to cause the shell and the core to be intimately and substantially uniformly united by the bonding material, the heating of the assembled parts being derived from high frequency currents and thereafter removing the stainless steel wire.

6. In the process of manufacturing gold-filled bar stock to be extruded into thin gold-filled wire, comprising the step of forming an intimate contact between an exterior shell of gold about a relatively hard core of a base metal with a sheet of bonding material intermediate said shell of gold and the core, a further step of wrapping a layer of binding wire having lower expanding characteristics than gold about the skin of the gold to hold same in intimate contact with its core during the heating and expanding of the core, a still further step of heating the assembled parts from the interior outwardly to at least a temperature sufficient for melting said bonding material whereby the inner surface of the gold and the core is suitably connected, with the heating being so carried out that the binding wire will expand an amount considerably less than the metal of the core and thereafter cooling and removing the binding wire.

7. The process of manufacturing plated bar stock comprising the step of placing a coating of metallic bonding material on the outer surface of a core of beryllium-copper, a further step of forcing a shell of gold about the bonding material and the core, a still further step of winding a binding wire of a material which is less expandable under heat than the core about the outside of the gold shell in a direction longitudinally thereof with the windings in adjacent relation with each other, a still further step of heating the assembled parts from the interior outwardly to a temperature sufficient to cause the metal bonding material to melt and to simultaneously cause the beryllium-copper core to expand an amount considerably more than the expansion of the binding wire whereby the metallic bonding material will substantially uniformly flow intermediate the gold shell and the core, allowing the assembled parts to cool to cause the bonding material to harden and substantially intimately and uniformly secure the gold shell to the core and thereafter removing the binding wire.

8. The process of manufacturing single plate bar stock comprising the step of placing a sheet of metal bonding material on the outer surface of a heat expandable metallic core, the second step of pressing a shell of metallic material onto the bonding material and core, a third step of binding the outer surface of the shell with a wire wound in adjacent convolutions to form binding means axially of the bar stock, said wire being less expandable than the core, and a fourth step of heating the assembled stock from the interior outwardly by high frequency current to a controlled temperature sufficient to melt the bonding material and to cause the metallic core to expand against the shell to cause the bonding material to form a more intimate bond between the core and the shell.

WILLIAM J. WRIGHTON.
TRACY C. JARRETT.